(12) United States Patent
Griffin

(10) Patent No.: US 9,043,420 B2
(45) Date of Patent: May 26, 2015

(54) SYSTEM, METHOD AND DEVICE FOR MIGRATING DATA

(71) Applicant: Research In Motion Limited, Waterloo (CA)

(72) Inventor: Jason Tyler Griffin, Kitchener (CA)

(73) Assignee: BLACKBERRY LIMITED, Waterloo, Ontario (CA)

( * ) Notice: Subject to any disclaimer, the term of this patent is extended or adjusted under 35 U.S.C. 154(b) by 210 days.

(21) Appl. No.: 13/723,302

(22) Filed: Dec. 21, 2012

(65) Prior Publication Data

US 2014/0181220 A1 Jun. 26, 2014

(51) Int. Cl.
*G06F 15/16* (2006.01)
*H04L 12/58* (2006.01)
*G06F 17/30* (2006.01)
*H04L 29/08* (2006.01)
*G06F 3/06* (2006.01)
*G06Q 10/10* (2012.01)

(52) U.S. Cl.
CPC .......... *H04L 51/08* (2013.01); *G06F 17/30575* (2013.01); *H04L 67/1095* (2013.01); *G06F 3/0647* (2013.01); *G06F 3/0605* (2013.01); *G06F 3/067* (2013.01); *G06Q 10/10* (2013.01)

(58) Field of Classification Search
USPC ........................................................ 709/206
See application file for complete search history.

(56) References Cited

U.S. PATENT DOCUMENTS

| | | | |
|---|---|---|---|
| 6,823,365 B1 | 11/2004 | Mattis et al. | |
| 7,251,680 B2* | 7/2007 | DeVos | 709/206 |
| 2005/0096926 A1* | 5/2005 | Eaton et al. | 705/1 |
| 2008/0183833 A1* | 7/2008 | Gaucas | 709/207 |
| 2009/0005010 A1 | 1/2009 | Dote et al. | |
| 2011/0213853 A1* | 9/2011 | Ocampo | 709/206 |
| 2011/0306003 A1* | 12/2011 | Kody et al. | 433/24 |
| 2013/0290442 A1* | 10/2013 | Dgani | 709/206 |
| 2014/0115085 A1* | 4/2014 | Plotkin | 709/206 |

FOREIGN PATENT DOCUMENTS

EP 1855206 A1 11/2007

OTHER PUBLICATIONS

Kindle Personal Documents Service—1996-2012 Downloaded from: www.amazon.com/gp/help/customer/display.html?nodeId=200767340#s2kemail; accessed Oct. 31, 2012.
Dropbox: Upload files to Your Dropbox Folder by Email—Jan. 24, 2011 Downloaded from: http://www.labnol.org/software/upload-dropbox-files-by-email/18526/: accessed Oct. 31, 2012).
Corresponding European Patent Application No. 12199088.1 Search Report dated May 7, 2013.

* cited by examiner

*Primary Examiner* — Abdullahi Salad
(74) *Attorney, Agent, or Firm* — Perry + Currier, Inc.

(57) ABSTRACT

A system, method and device for migrating data are provided. An attachment type of an attachment received with a message at a device is determined, the message associated with a network address of the device dedicated to data migration. The attachment is stored in a portion of the memory associated with the attachment type.

17 Claims, 12 Drawing Sheets

SYSTEM, METHOD AND DEVICE FOR MIGRATING DATA

FIELD

The specification relates generally to mobile devices, and a system, method and device for migrating data.

BACKGROUND

The evolution of computers is currently quite active in the mobile device environment. It is now well-known to include calendaring, contacts, and messaging functions in mobile devices. More recently, there has been a veritable explosion of the number and type of applications that are configured to the unique form factors and computing environments of mobile devices. In particular migrating data between devices, especially when each device is associated with a different network and/or data ecosystem, can be challenging.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
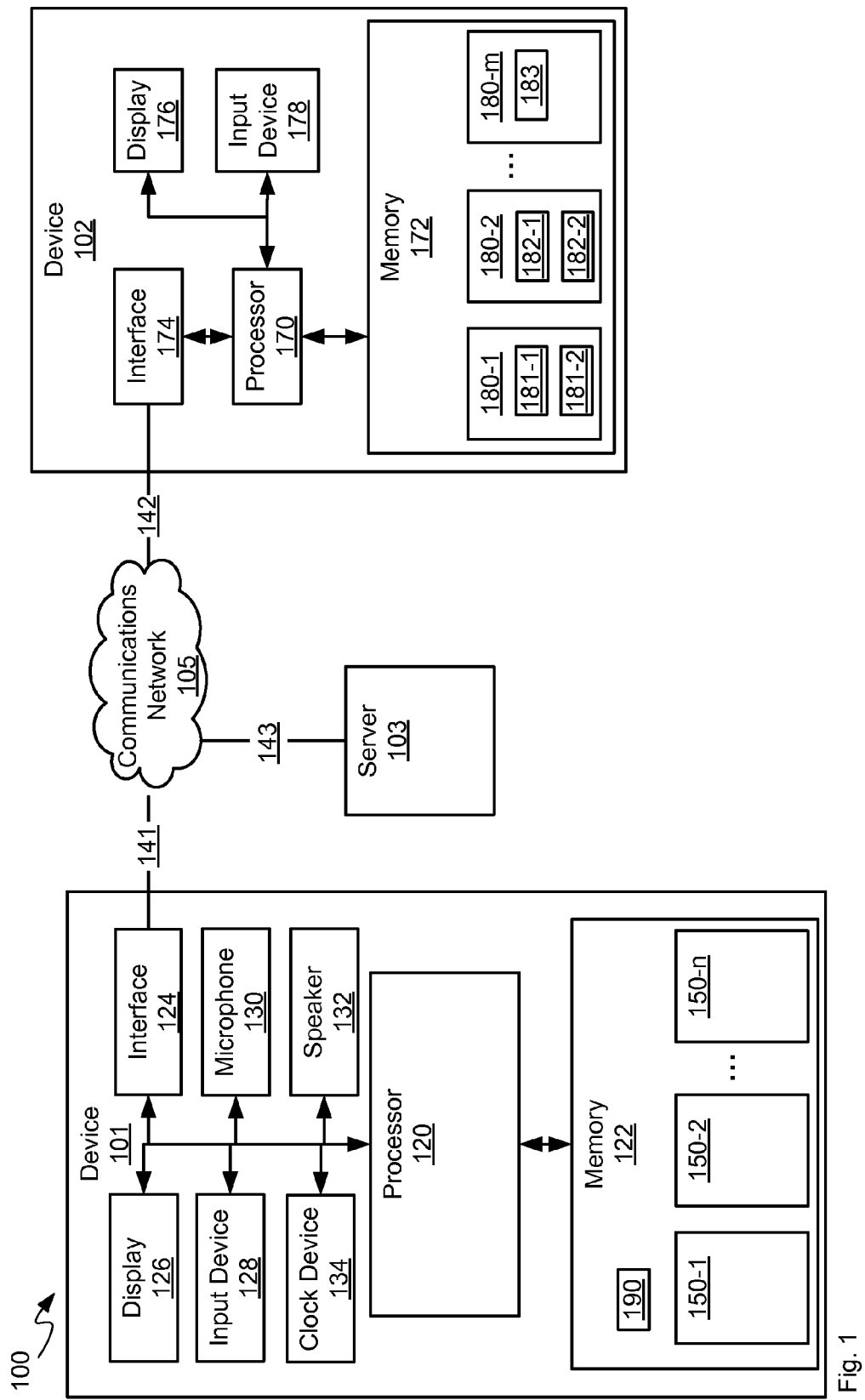
FIG. 1 depicts a system for migrating data, according to non-limiting implementations.

In this specification, elements may be described as "configured to" perform one or more functions or "configured for" such functions. In general, an element that is configured to perform or configured for performing a function comprises structure for performing the function, or is enabled to perform the function, or is suitable for performing the function, or is adapted to perform the function, or is operable to perform the function, or is otherwise capable of performing the function.

The specification provides a device comprising: a processor, a communication interface and a memory, the processor configured to: determine an attachment type of an attachment received with a message via the communication interface, the message associated with a network address of the device dedicated to data migration; and, store the attachment in a portion of the memory associated with the attachment type.

The message can be received from one or more of a given device and a given account, and the attachment can comprise data for migrating from one or more of the given device and the given account.

The processor can be further configured to: when the message is received from any address other than a set of given addresses respectively associated with a set of given devices, discard the message without storing the attachment.

The processor can be further configured to: when the message is received after a given time period, discard the message without storing the attachment.

The processor can be further configured to discard the message once the attachment is stored in the portion of the memory associated with the attachment type.

The processor can be further configured to prevent the message from being provided in a mailbox of a messaging application.

The processor can be further configured to prevent mailbox notifications of the message from being provided at the device.

The device can further comprise a display, and the processor can be further configured to provide an indication at the display of receiving the attachment.

The device can further comprise a display, and the processor can be further configured to: prior to receiving the message, receive a communication, via the communication interface, that the network address dedicated to data migration has been associated with the device for a given time period; and, provide an indication at the display of the given time period.

The portion of the memory associated with the attachment type can comprise one or more of a folder and a database category associated with one or more of the attachment type and an application associated with the attachment type.

Another aspect of the specification provides a method comprising: at a device comprising a processor, a communication interface and a memory, determining, at the processor, an attachment type of an attachment received with a message via the communication interface, the message associated with a network address of the device dedicated to data migration; and, storing the attachment in a portion of the memory associated with the attachment type.

The message can be received from one or more of a given device and a given account, and the attachment can comprise data for migrating from one or more of the given device and the given account.

The method can further comprise: when the message is received from any address other than a set of given addresses respectively associated with a set of given devices, discarding the message without storing the attachment.

The method can further comprise: when the message is received after a given time period, discarding the message without storing the attachment.

The method can further comprise discarding the message once the attachment is stored in the portion of the memory associated with the attachment type.

The method can further comprise preventing the message from being provided in a mailbox of a messaging application.

The method can further comprise preventing mailbox notifications of the message from being provided at the device.

The device can further comprise a display, and the method can further comprise providing an indication at the display of receiving the attachment.

The device can further comprise a display, and the method can further comprise: prior to receiving the message, receiving a communication, via the communication interface, that the network address dedicated to data migration has been associated with the device for a given time period; and, providing an indication at the display of the given time period.

The portion of the memory associated with the attachment type can comprise one or more of a folder and a database category associated with one or more of the attachment type and an application associated with the attachment type.

Yet a further aspect of the specification provides a computer program product, comprising a computer usable medium having a computer readable program code adapted to be executed to implement a method comprising: at a device comprising a processor, a communication interface and a memory, determining, at the processor, an attachment type of an attachment received with a message via the communication interface, the message associated with a network address of the device dedicated to data migration; and, storing the attachment in a portion of the memory associated with the attachment type. The computer usable medium can comprise a non-transitory computer usable medium.

FIG. 1 depicts a system 100 for migrating data, according to non-limiting implementations. System 100 generally comprises device 101 in communication with a further device 102, and optionally a server 103 via at least one communications network 105, according to non-limiting implementations. The at least one communications network 105 will be interchangeably referred to hereafter as network 105. Device 101 comprises a processor 120 interconnected with a memory 122, a communications interface 124 (interchangeably referred to hereafter as interface 124), a display 126 and an input device 128, and optionally a microphone 130 a speaker 132 and a clock device 134. It is further appreciated that device 101 communicates with device 102 and server 103 via interface 124, a link 141 between device 101 and network 105, a link 142 between device 102 and network 105, and a link 143 between server 103 and network 105.

Further, memory 122 comprises portions 150-1, 150-2 . . . 150-$n$ associated with different file types and/or different applications. Portions 150-1, 150-2 . . . 150-$n$ will be interchangeably referred to herein, collectively, as portions 150 and generically as a portion 150. Further, while only three portions 150 are depicted, it is appreciated that the number of portions 150 is generally non-limiting. Indeed, each portion 150 is generally associated with one or more of files of a respective type and files associated with a respective application. For example: a first portion 150 can store picture files; a second portion 150 can store video files; and a third portion 150 can store files associated with a personal information manager (PIM) application, including, but not limited to, contact files, messaging files, and the like. However, the file types are also generally non-limiting.

Indeed, it is appreciated that each portion 150 can comprise a folder and/or database category for storing respective file types and/or storing files associated with a respective application. Further, portions 150 can comprise one or more of a memory structure, a database structure, a file structure, a folder structure, and the like.

It is yet further appreciated that, in some implementations, portions 150 can comprise physical portions of memory 122; however portions 150 can also comprise a virtual memory structure, and portions 150 need not be physically isolated from one another at memory 122; rather portions 150 and files stored therein, can be related via a database structure and/or associated identifiers managed by processor 120.

Device 102 comprises a processor 170 interconnected with a memory 172, a communications interface 174 (interchangeably referred to hereafter as interface 174, a display 176, an input device 178, and optionally a microphone, a speaker and a clock device (not depicted). It is further appreciated that memory 172 comprises portions 180-1, 180-2 . . . 180-$m$ associated with different file types and/or different applications. Portions 180-1, 180-2 . . . 180-$m$ will be interchangeably referred to herein, collectively, as portions 180 and generically as a portion 180. Further, while only three portions 180 are depicted, it is appreciated that the number of portions 180 is generally non-limiting.

Portions 180 are generally similar to portions 150 described above, and hence each portion 180 is generally associated with one or more of files of a respective type and files associated with a respective application. For example: a first portion 180 can store picture files; a second portion 180 can store video files; and a third portion 180 can store files associated with a personal information manager (PIM) application, including, but not limited to, contact files, messaging files, and the like. However, the file types are generally non-limiting.

However, a memory structure and/or a database structure and/or a file structure and/or a folder structure of each of portions 150, 180 need not be identical to each other. In other words, portions 180 can comprise a different memory structure and/or a database structure and/or a file structure and/or a folder structure than portion 150, and indeed, each of portions 150, 180 can be associated with operating systems specific to respective devices 101, 102.

Further, portions 150, 180 need not be in a one-to-one relationship with each other. For example a given portion 180 can store pictures of a first type (e.g. jpeg files) and another portion 180 can store pictures of a second type (e.g. gif files), while a given portion 150 can store pictures of all types (e.g. both jpeg files and gif files).

In any event, as depicted, initially portion 180-1 stores files 181-1, 181-2, portion 180-2 stores files 182-1, 181-2 and portion 180-$m$ stores a file 183. It is appreciated that files 181-1, 181-2 are one or more of files of a first type and/or files associated with a first application. Similarly, files 182-1, 182-2 are one or more of files of a second type, different from the first type, and/or files associated with a second application, different from the first application. Similarly, file 183 is one or more of a file of a third type, different from the first type and the second type, and/or a file associated with a third application, different from the first application and the second application.

Files 181-1, 181-2 will be interchangeably referred to herein, collectively, as files 181 and generically as a file 181. Further, while only two files 181 are depicted, it is appreciated that the number of files 181 is generally non-limiting. Similarly, files 182-1, 182-2 will be interchangeably referred to herein, collectively, as files 182 and generically as a file 182.

Further, while only two files 182 are depicted, it is appreciated that the number of files 182 is generally non-limiting. Further, while only one file 183 is depicted, it is appreciated that the number of files 183 is generally non-limiting.

In other words, each portion 180 can comprise any number of respective files.

Now consider the following scenario: a user wishes to migrate from device 102 to device 101. For example, the user is changing to newer device 101 from older device 102. Further the user can also be changing carriers and/or networks, and/or the like. While device 101 can be activated on associated network, including, but not limited to, network 105, the user has no easy way of transferring data from device 102 to device 101, including files 181, 182, 183, especially if devices 101, 102 are of different types and/or are associated with different entities.

In other words, initially, each portion 150 is depicted as empty and/or does not comprise files 181, 182, 183 and it is desirable to transfer files 181, 182, 183 to device 101. However, each portion 150 need not be initially empty; rather, each portion 150 comprise files (not depicted) different from files 181, 182, 183, including, but not limited to, files native to device 101, files added to device 101 via removable memory and the like.

In any event, as will presently be described, to effect migration of data, processor 120 is generally enabled to: determine an attachment type of an attachment received with a message via the communication interface 124, the message associated with a network address of device 101 dedicated to data migration; and, store the attachment in a portion of memory 122 associated with the attachment type. In other words, as will presently be described, messages associated with a network address dedicated to data migration, that are received at device 101 with attachments, are processed to automatically store the attachments in a portion 150 associated with the attachment type. Hence, data, such as files 181, 182, 183 can be migrated to device 101 by attaching them to messages originating at device 102 that are transmitted to the network address of device 101 dedicated to data migration.

Further, such a dedicated data migration network address is generally distinct from a public network address associated with device 101. In other words, device 101 can be associated with at least two network addresses: a public network address used for messaging, email and the like, such that messages associated with the public network address received at device 101 are provided at a mailbox at device 101; and a dedicated data migration network address for migrating data from device 102 to device 101.

Device 101 can be any type of electronic device that can be used in a self-contained manner. Device 101 includes, but is not limited to, any suitable combination of electronic devices, communications devices, computing devices, personal computers, laptop computers, portable electronic devices, mobile computing devices, portable computing devices, tablet computing devices, laptop computing devices, desktop phones, telephones, PDAs (personal digital assistants), cellphones, smartphones, e-readers, internet-enabled appliances and the like. Other suitable devices are within the scope of present implementations.

The network address of device 101 dedicated to data migration can be assigned to device by server 103. For example, server 103 can comprise one or more of an activation server, a message server, a file management server and the like, associated with device 101, configured for one or more of device activation, message management and/or file management. Specifically, server 103 is generally enabled to provision a dedicated data migration network address for device 101. Server 103 can otherwise be based on any well-known server environment including a module that houses one or more central processing units, volatile memory, persistent memory (e.g. hard disk devices) and network interfaces to allow server 103 to communicate over link 143. For example, server 103 can comprise a Sun Fire 8800 series server running a UNIX operating system, from Oracle Corporation, Inc. of Santa Clara Calif., and having eight central processing units each operating at about three thousand megahertz and having more than sixteen gigabytes of random access memory. However, it is to be emphasized that this particular server is merely exemplary, and a vast array of other types of computing environments for server 103 are contemplated. It is further more appreciated that server 103 can comprise any suitable number of servers that can perform different functionality of server implementations described herein.

Links 141, 142, 143 comprise any suitable links for enabling devices 101, 102 and server 103, respectively, to communicate with network 105. Links 141, 142, 143 can hence each include any suitable combination of wired and/or wireless links, wired and/or wireless devices and/or wired and/or wireless networks, including but not limited to any suitable combination of USB (universal serial bus) cables, serial cables, wireless links, cell-phone links, cellular network links (including but not limited to 2G, 2.5G, 3G, 4G+, and the like) wireless data, Bluetooth links, NFC (near field communication) links, WiFi links, WiMax links, packet based links, the Internet, analog networks, the PSTN (public switched telephone network), access points, and the like, and/or a combination.

It is appreciated that FIG. 1 further depicts a schematic diagram of device 101 according to non-limiting implementations. It should be emphasized that the structure of device 101 in FIG. 1 is purely an example, and contemplates a device that can be used for both wireless voice (e.g. telephony) and wireless data communications (e.g. email, web browsing, text, and the like). However, while FIG. 1 contemplates a device that can be used for telephony, in other implementations, device 101 can comprise a device enabled for implementing any suitable specialized functions, including but not limited to one or more of telephony, computing, appliance, and/or entertainment related functions.

Device 101 comprises at least one input device 128 generally enabled to receive input data, and can comprise any suitable combination of input devices, including but not limited to a keyboard, a keypad, a pointing device, a mouse, a track wheel, a trackball, a touchpad, a touch screen and the like. Other suitable input devices are within the scope of present implementations.

Input from input device 128 is received at processor 120 (which can be implemented as a plurality of processors, including but not limited to one or more central processors (CPUs)). Processor 120 is configured to communicate with a memory 122 comprising a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of device 101 as described herein are typically maintained, persistently, in memory 122 and used by processor 120 which makes appropriate utilization of volatile storage during the execution of such programming instructions. Those skilled in the art recognize that memory 122 is an example of computer readable media that can store programming instructions executable on processor 120. Furthermore, memory 122 is also an example of a memory unit and/or memory module.

In particular, it is appreciated that memory 122 stores an application 190, that, when processed by processor 120, enables processor 120 to: determine an attachment type of an attachment received with a message via the communication interface 124, the message associated with a network address of device 101 dedicated to data migration; and, store the attachment in a portion of memory 122 associated with the attachment type.

It is yet further appreciated that application 190 is an example of programming instructions stored at memory 122.

Processor 120 in turn can also be configured to communicate with a display 126, and optionally a microphone 130 and a speaker 132. Display 126 comprises any suitable one of or combination of CRT (cathode ray tube) and/or flat panel displays (e.g. LCD (liquid crystal display), plasma, OLED (organic light emitting diode), capacitive or resistive touch screens, and the like). When display 126 comprises a touch screen, it is appreciated that display 126 and input device 128 can be combined into one apparatus. Microphone 130, when present, comprises any suitable microphone for receiving sound and converting the sound to sound data. Speaker 132, when present, comprises any suitable speaker for providing sound from sound data, audible alerts, audible communications received from remote communication devices, and the like, at device 101.

In some implementations, input device 128 and display 126 are external to device 101, with processor 120 in communication with each of input device 128 and display 126 via a suitable connection and/or link.

Processor 120 also connects to interface 124, which can be implemented as one or more radios and/or connectors and/or network adaptors, configured to communicate with network 105 via link 141. In general, it will be appreciated that interface 124 is configured to correspond with the network architecture that is used to implement link 141, as described above. In other implementations a plurality of links with different protocols can be employed and thus interface 124 can comprise a plurality of interfaces to support each link. In any event, it is appreciated that any suitable combination of interfaces is within the scope of present implementations.

Clock device 134 can comprise a time device, a clock at processor 120, a software-based clock and the like. Regardless of a configuration of clock device 134, clock device 134 can be used by processor 120 to determine a time that a message has been received.

Alternatively, processor 120 can determine an approximate time that a message has been received via metadata and/or time stamps associated with a message.

It is yet further appreciated that device 101 comprises a power source (not depicted), for example a battery or the like. In some implementations the power source can comprise a connection to a mains power supply and a power adaptor (e.g. and AC-to-DC (alternating current to direct current) adaptor).

Further, it should be understood that in general a wide variety of configurations for device 101 are contemplated.

Figure 2:
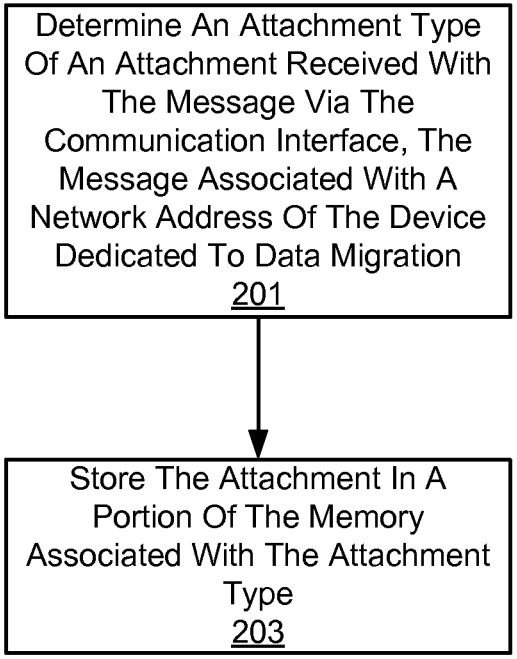
FIG. 2 depicts a flowchart of a method for migrating data, according to non-limiting implementations.

It is yet further appreciated that FIG. 2 further depicts a schematic diagram of device 102 according to non-limiting implementations. However, the structure of device 102 is generally similar to device 101, and hence processor 170 is similar to processor 120, memory 172 is similar to memory 122, interface 174 is similar to interface 124, display 176 is similar to display 126 and input device 178 is similar to input device 128, except as otherwise discussed. For example, devices 101, 102 can be different device types and/or brands and/or be associated with different entities and/or have different operating systems and/or have different memory structures, and the like.

Attention is now directed to FIG. 2 which depicts a flow-chart of a method 200 for migrating data, according to non-limiting implementations. In order to assist in the explanation of method 200, it will be assumed that method 200 is performed using system 100. Furthermore, the following discussion of method 200 will lead to a further understanding of system 100 and its various components. However, it is to be understood that system 100 and/or method 200 can be varied, and need not work exactly as discussed herein in conjunction with each other, and that such variations are within the scope of present implementations.

It is appreciated that, in some implementations, method 200 is implemented in system 100 by processor 120 of device 101. Indeed, method 200 is one way in which device 101 can be configured. It is to be emphasized, however, that method 200 need not be performed in the exact sequence as shown, unless otherwise indicated; and likewise various blocks may be performed in parallel rather than in sequence; hence the elements of method 200 are referred to herein as "blocks" rather than "steps". It is also to be understood, however, that method 200 can be implemented on variations of system 100 as well.

At block 201, processor 120 determines an attachment type of an attachment received with a message via communication interface 124, the message associated with a network address of device 101 dedicated to data migration.

At block 203, processor 120 stores the attachment in a portion 150 of memory 122 associated with the attachment type.

A non-limiting example of method 200 will now be described with reference to FIGS. 3 to 12. FIGS. 3, 5 to 7, and 9 to 12 are substantially similar to FIG. 1, with like elements having like numbers. FIGS. 4 and 8 depict a front perspective view of display 126 of device 101 and graphic user interfaces (GUIs) provided thereon, as described below.

Figure 3:
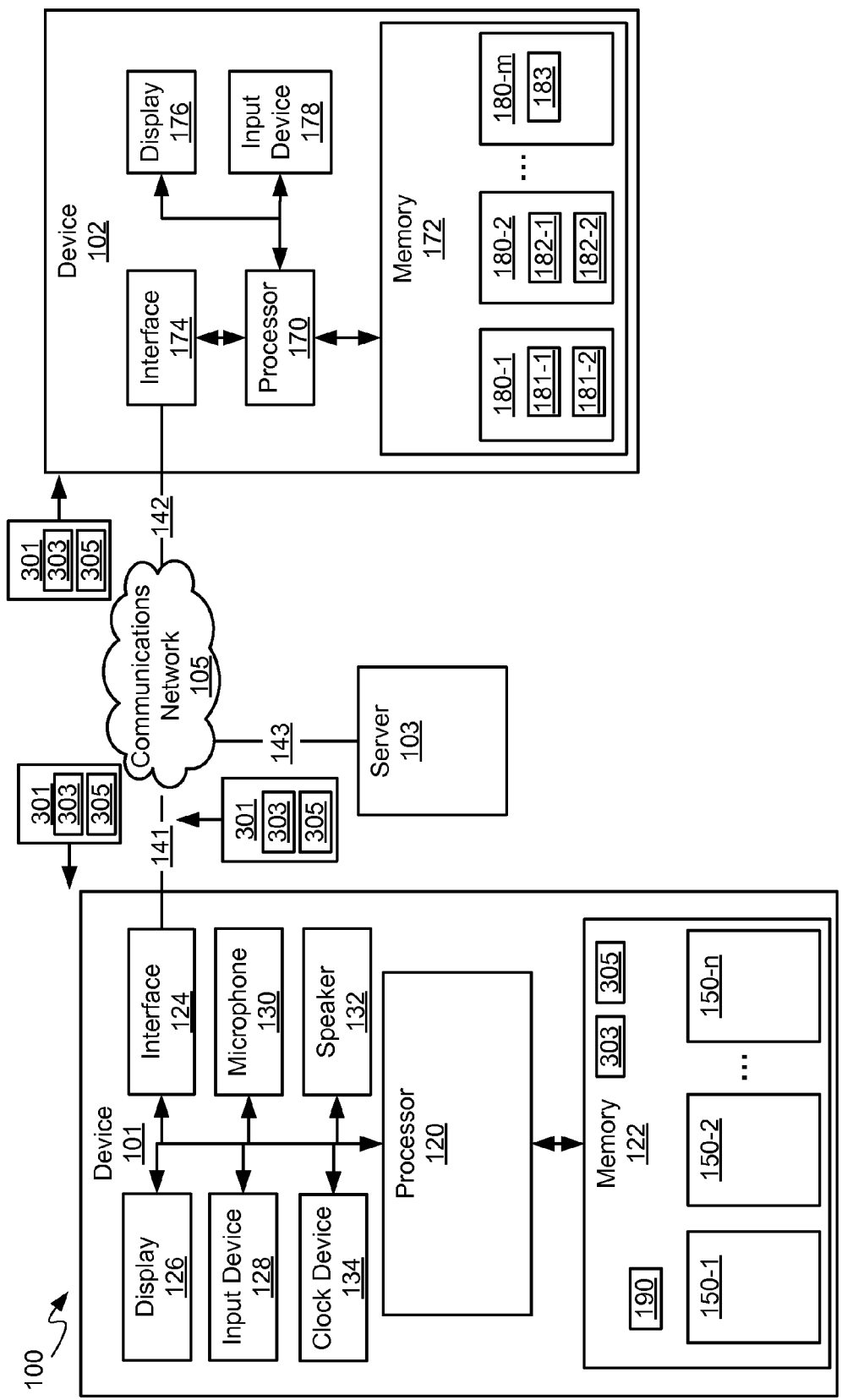
FIG. 3 depicts the system of FIG. 1 with a server provisioning the system for migration of data, according to non-limiting implementations.
Figure 4:
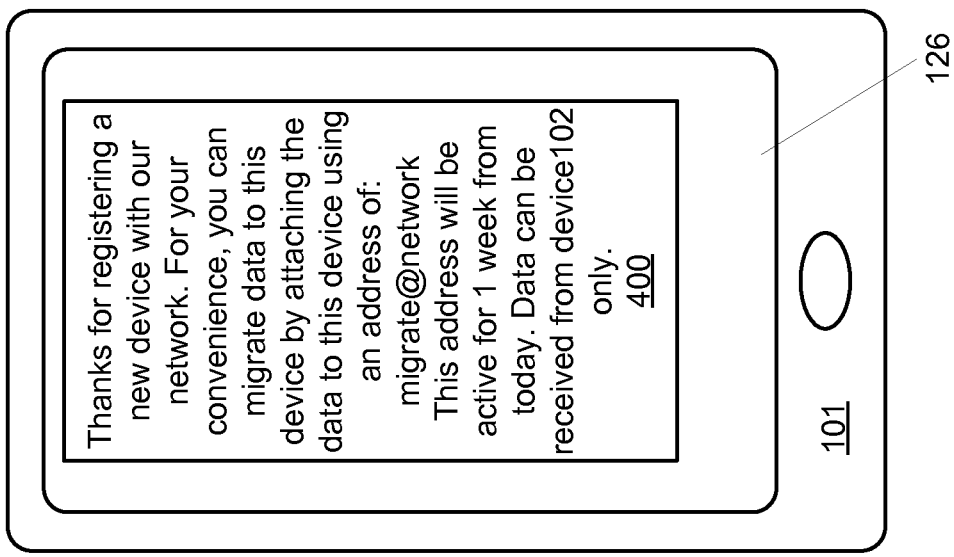
FIG. 4 depicts a Graphic User Interface (GUI) provided at a first device to which data is to be migrated, according to non-limiting implementations.

With reference to FIG. 3, server 103 transmits a communication 301 to one or more of devices 101, 102 via links 141, 142, 143 and network 105, communication 301 indicative that a network address dedicated to data migration has been associated with device 101. For example, communication 301 can comprise a message addressed to public address of one or more of devices 101, 102 that is provided at a respective mailbox of each of devices 101, 102. Communication 301 can be initiated one or more of automatically, when device 101 is activated with server 103 and/or by an administrator of server 103. In depicted implementations, communication 301 comprises a given time period 303 a network address dedicated to data migration, and an identifier 305 of device 102, which are stored in memory 122 when communication 301 is received at device 101.

For example, in some implementations, as described, the network address dedicated to data migration can be associated with a device 101 for given time period 303, for example a few days, a few weeks, and the like; in these implementations, communication 301 can be indicative that the network address dedicated to data migration can be associated with a device 101 for given time period 303.

Further, in some implementations, as described, only data received from device 102, as identified by identifier 305, via the network address dedicated to data migration (which can be associated with device 101), is migrated. Data received from other devices is discarded, as described in further detail below. Alternatively, identifier 305 can identify a given account associated with device 102 from which data can be migrated.

It is further appreciated that server 103 can determine given time period 303 and identifier 305 via a provisioning process and/or via a registration process. In other words, an application (not depicted) at device 101 can be used to register device 101 with server 103 and one or more of given time period 303 and identifier 305 can be determined via the interaction between device 101 and server 103 during the registration.

In yet further implementations, communication 301 does not comprise one or more of given time period 303 and identifier 305; rather, one or more given time period 303 and identifier 305 can be received at device 101 via input device 128.

Further, in some implementations, more than one identifier of given devices and/or given accounts from which data can be received via the network address dedicated to data migration, for example, device 102 and another device (not depicted) and/or an account associated with device 102 and another account.

It is appreciated that by limiting one or more of a time period during which data can migrate to device 101 via the data migration network address and devices from which migrating data can be received, the security of system 100 is improved. In other words, spammers and/or entities intending harm to device 101 can obtain the data migration network address and attempt to send messages to device 101 including malicious data as attachments. As will presently be described, when such messages are received outside of given time period 303 and/or are received from devices and/or accounts other than that identified by identifier 305, such messages are rejected by device 101.

Attention is next directed to FIG. 4, which depicts a front perspective view of display 126 of device 101, where an indication 400 of communication 301 and/or given time period 303 and/or identifier 305 can be provided at display 126. In other words, indication 400 comprises a text box and/or a graphical user interface (GUI) that comprises text including the network address dedicated to data migration (e.g. "migrate@network"), given time period 303 for which the network address is active (e.g. "1 week"), and identifier 305 of device 102 (e.g. "device 102"). It is further appreciated that indication 400 can be provided upon receipt of communication 301 and/or when a communication 301 is accessed via a mailbox at device 101.

The network address can comprise one or more of an electronic address, an email address, an IP address, a messaging address, and the like. While a generic network address "migrate@network" is described in a non-limiting example, any type of network address and/or electronic address is within the scope of present implementations.

While not depicted, an indication similar to indication 400 can be also provided at display 176 of device 102.

Figure 5:
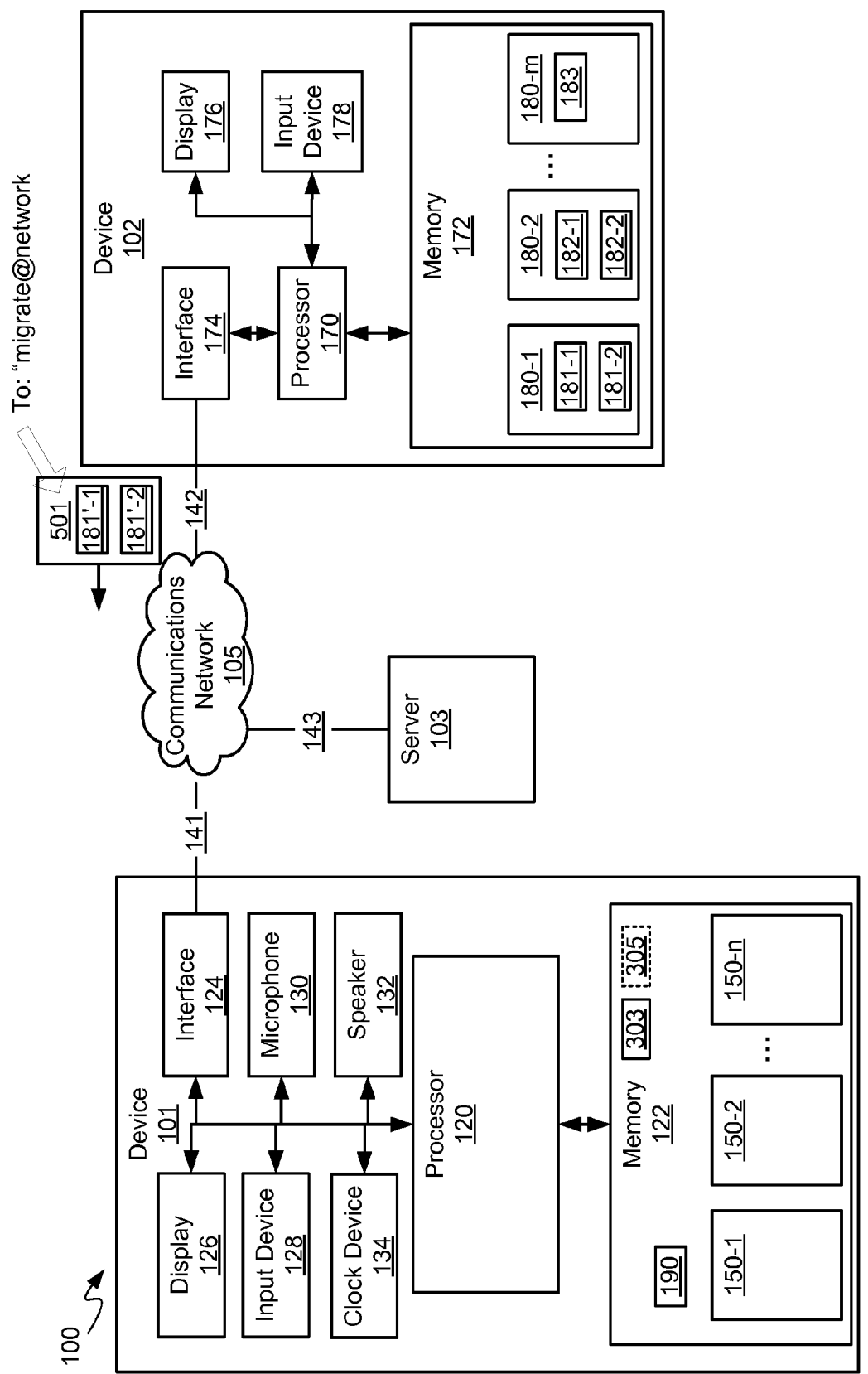
FIG. 5 depicts the system of FIG. 1 with a second device transmitting data to be migrated to the first device as attachment to a message via a network address dedicated to data migration, according to non-limiting implementations.

In any event, with reference to FIG. 5, in order to migrate data from device 102 to device 101, a message 501 is transmitted to the network address of device 101 dedicated to data migration. Data that is to be migrated to device 101 is attached to message 501; for example, in depicted implementations, attachments 181'-1, 181'-2 are attached to message 501, attachment 181'-1 comprising a copy of file 181-1, and attachment 181'-2 comprising a copy of file 181-2. Attachments 181'-1, 181'-2 will be interchangeably referred to hereafter, collectively, as attachments 181', and generically as an attachment 181'.

It is appreciated that message 501 can be generated via a messaging application at device 102, and attachments 181' can similarly be attached to message 501 by selecting files 181 for attachment to message 501 via the messaging application.

Figure 6:
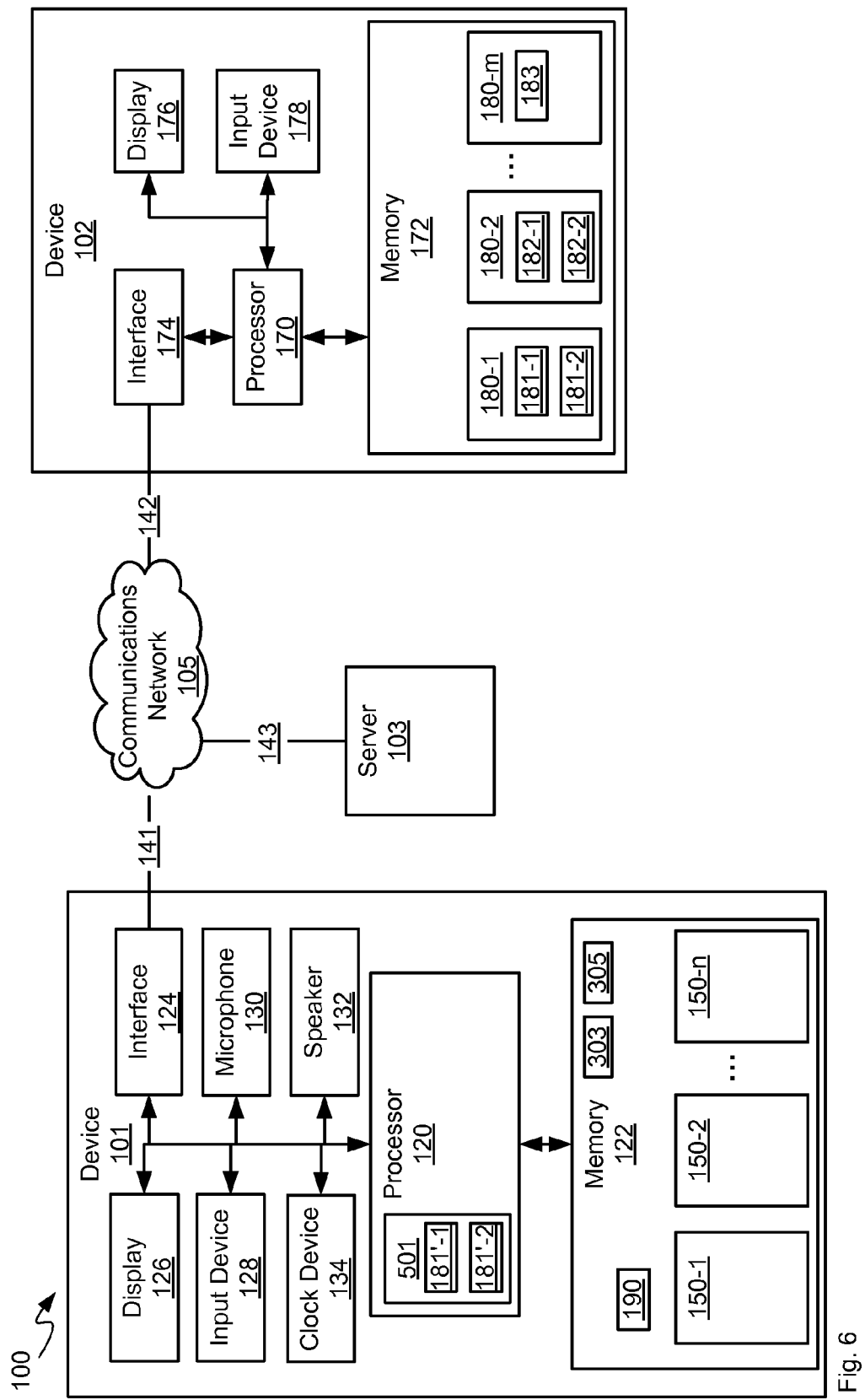
FIG. 6 depicts the system of FIG. 1 with the first device receiving data to be migrated from the second device as attachments to a message via the network address dedicated to data migration, according to non-limiting implementations.

In any event, with reference to FIG. 6, message 501 is received at device 101 and processed by processor 120. Processor 120 determines that message 501 is associated with the network address of device 101 dedicated to data migration, for example by processing metadata associated with message 501, the metadata comprising an indicator of the network address.

Processor 120 can also optionally determine that message 501 has been received within given time period 303 by comparing a time that message 501 was received, as determined by clock device 134 and/or processor 120, with given time period 303.

Processor 120 can also optionally determine that message 501 was received from device 102 and/or a given account by comparing metadata associated with message 501 with identifier 305. In other words, processor 120 can determine that message 501 is received within given time period 303 and/or that message 501 is received from one or more of a given device and a given account. Processor 120 then further determines that attachments 181' comprise data for migrating from one or more of the given device and the given account.

At block 201, processor 120 further determines an attachment type of each of attachments 181' received with message 501; in other words, processor 120 determines an attachment type of each of attachments 181'.

For example, processor 120 can determine an attachment type of each of attachments 181' by one or more of determining an extension of each of attachments 181', processing each of attachments 181', determining a file structure of each of attachments 181' and the like.

Figure 7:
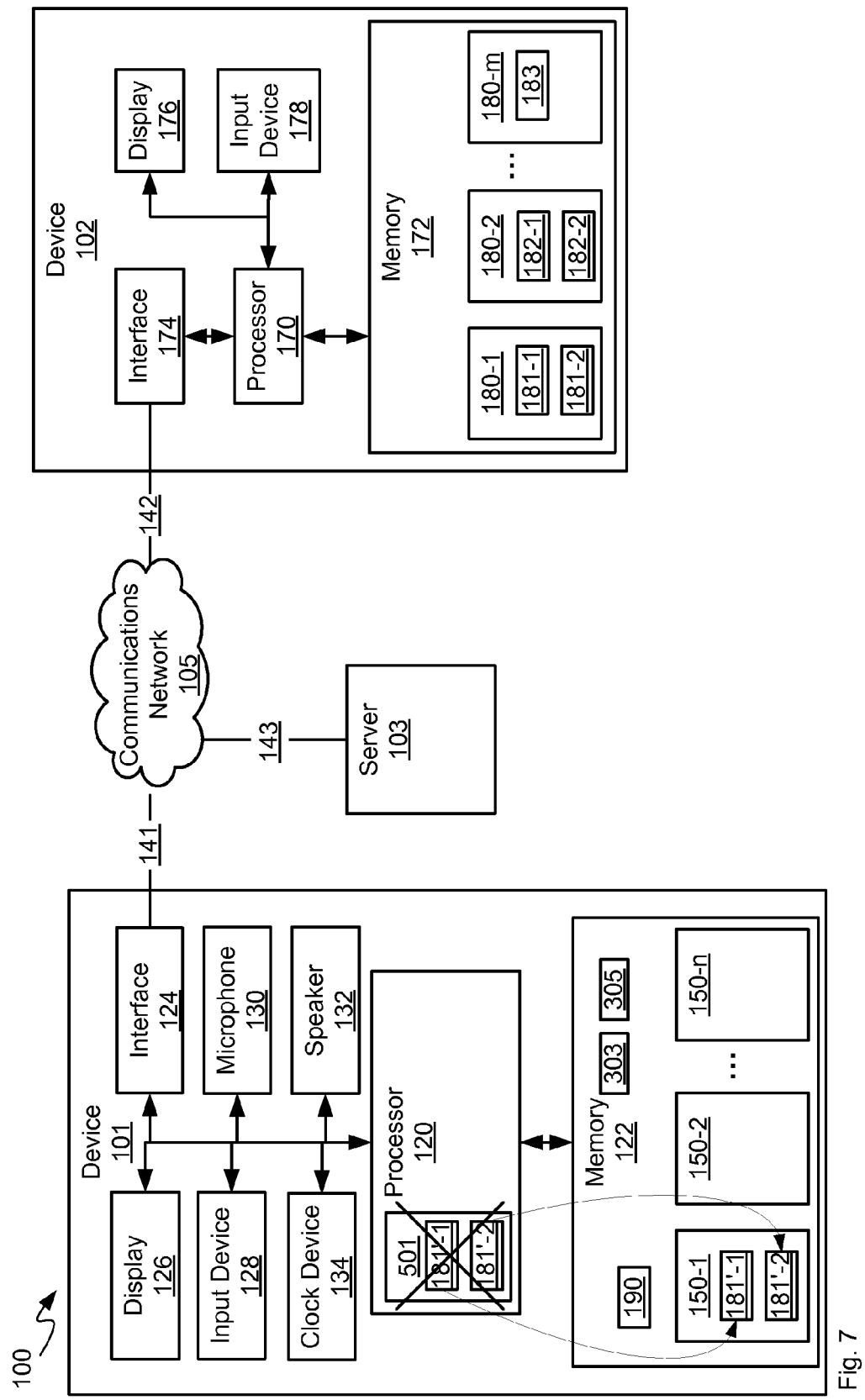
FIG. 7 depicts the system of FIG. 1 with the first device storing attachments to a message based on attachment type, according to non-limiting implementations.
Figure 8:
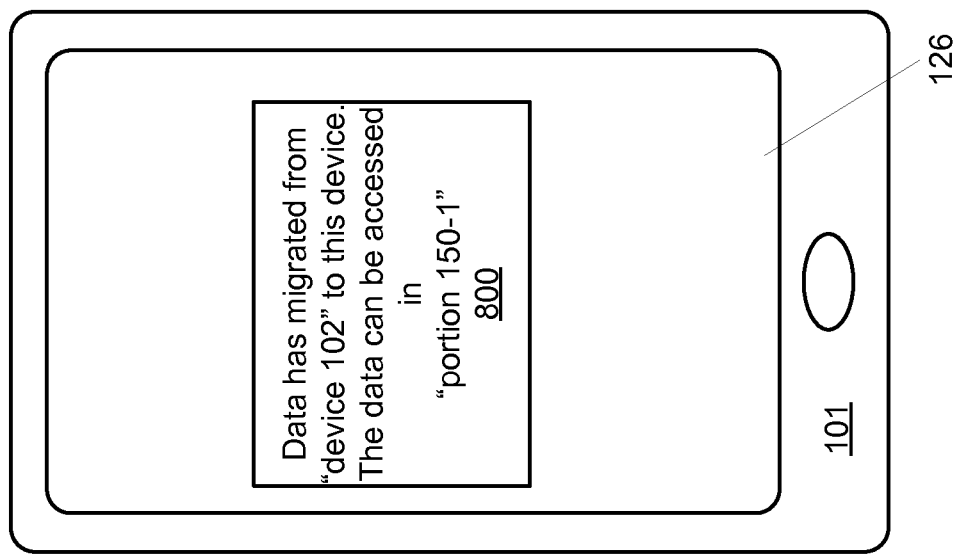
FIG. 8 depicts a GUI provided at the first device after the data is migrated, according to non-limiting implementations.

In any event, with reference to FIG. 7, at block 203 processor 120 stores attachments 181' in a portion 150 of memory 122 associated with the attachment type of attachments 181'. In implementations depicted in FIG. 7, as each of attachments 181' are of similar types, for example picture file types, each of attachments 181' are stored in portion 150-1, which can be associated with picture file types.

Further, as depicted message 501 can be discarded and/or deleted. In other words, message 501 is not provided at a mailbox and/or stored at device 101; rather, attachments 181' are automatically categorized and filed in memory 122 at a portion 150 associated with the attachment type.

In other words, processor 120 is further configured to discard message 501 once attachments 181' are stored in portion 150 of memory 122 associated with the attachment type. Further, processor 120 is configured to prevent message 501 from being provided in a mailbox of a messaging application.

In some implementations, with reference to FIG. 8, processor 120 is further configured to provide an indication 800 at display 126 of receiving attachments 181'. In other words, indication 800 comprises a text box and/or a GUI that comprises text that can include, but is not limited to: an identifier of device 102 (e.g. in depicted implementations "device 102", though any suitable identifier is within the scope of present implementations, including, but not limited to, a network address of device 102); an identifier of one or more portions 150 where attachments 181' were stored (e.g. in depicted implementations "portion 150-1", though any suitable identifier is within the scope of present implementations, including, but not limited to, natural name identifiers of portions 150 where attachments 181' were stored); and one or more identifiers of attachments 181' (not depicted).

In other words, indication 800 can be provided to generally provide an indication at display 126 of receiving notification of migration of data, but otherwise, receipt of message 501 occurs in the background. For example, indication 800, and the like, is different from mailbox notifications which provide notifications of new messages at a mailbox of device 101. Hence, in these implementations, processor 120 is further configured to prevent mailbox notifications of message 501 from being provided at device 101, for example in a status bar and the like.

To migrate further data, further messages can be transmitted from device 102 to device 101.

Figure 9:
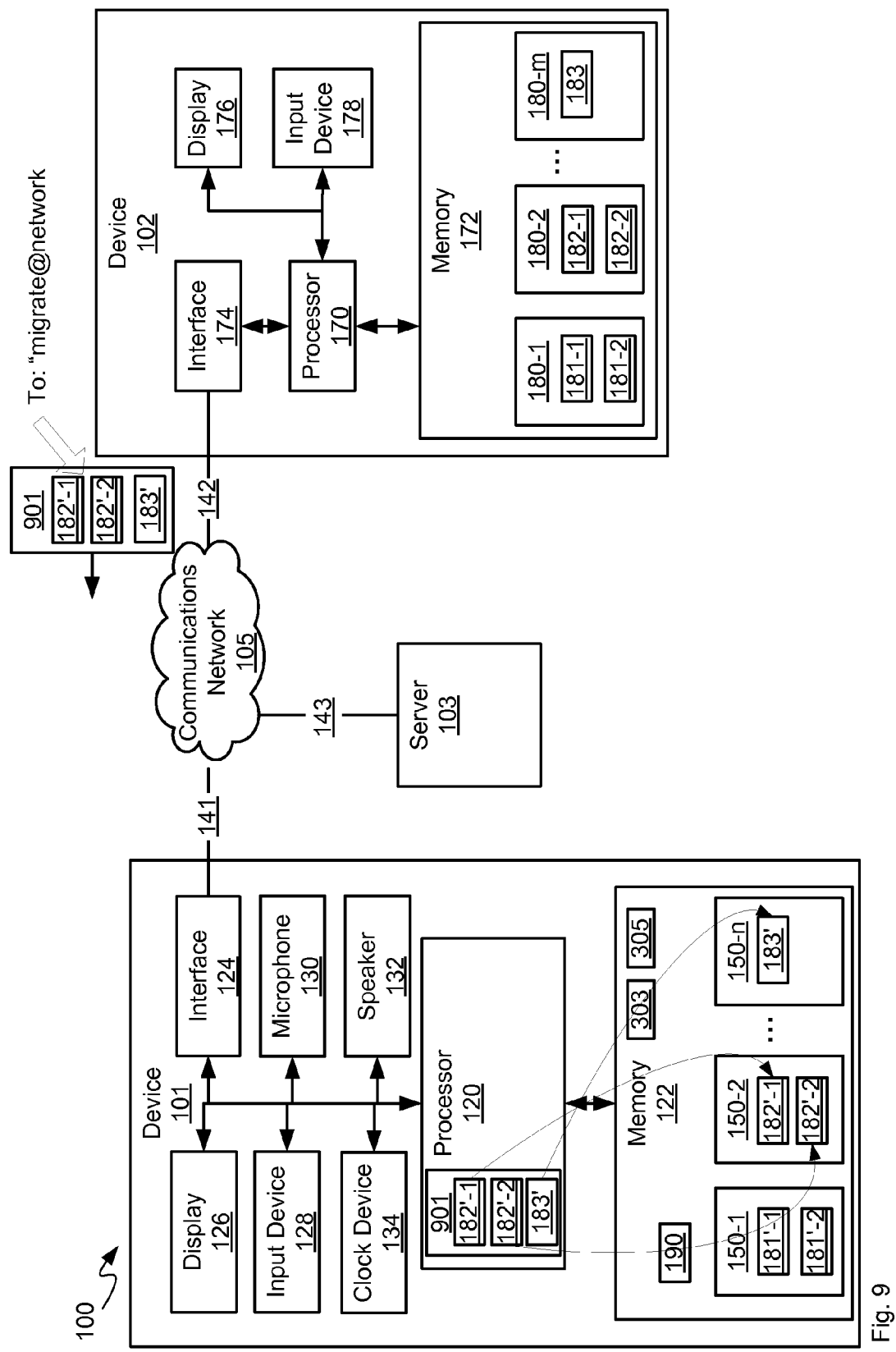
FIG. 9 depicts the system of FIG. 1 with the second device again transmitting data to be migrated to the first device as attachment to a message via the network address dedicated to data migration, according to non-limiting implementations.

For example, with reference to FIG. 9, another message 901 is transmitted to device 101 from device 102 with attachments 182'-1, 182'-2, 183, attachment 182'-1, 182'-2 respectively comprising copies of files 182-1, 182-2 and attachment 183' comprising a copy of file 183. In other words, in these implementations, attachments 182'-1, 182'-2 and attachment 183' are different attachment types (and/or different files types). Attachments 182'-1, 182'-2 will be interchangeably referred to hereafter, collectively, as attachments 182', and generically as an attachment 182'.

When message 901 is received at device 101, processor 120 again optionally determines that message 901 has been received within given time period 303 and/or from a device and/or account identified by identifier 305. Processor 120 then determines an attachment type of each of attachments 182', 183' to message 901 and stores attachments 182', 183' at respective portions 150 of memory 122 associated with the respective attachment type. For example, attachments 182' are stored in portion 150-2 and attachment 183' is stored in portion 150-*n*.

From FIG. 9, it is also apparent that all data from device 102 has now migrated to device 101 by attaching copies of files 181, 182, 183 to messages 501, 901.

Further, while only two messages 501, 901 have been used, in example implementations, to migrate data from device 102 to device 101, any number of messages can be used to migrate data from device 102 to device 101.

Figure 10:
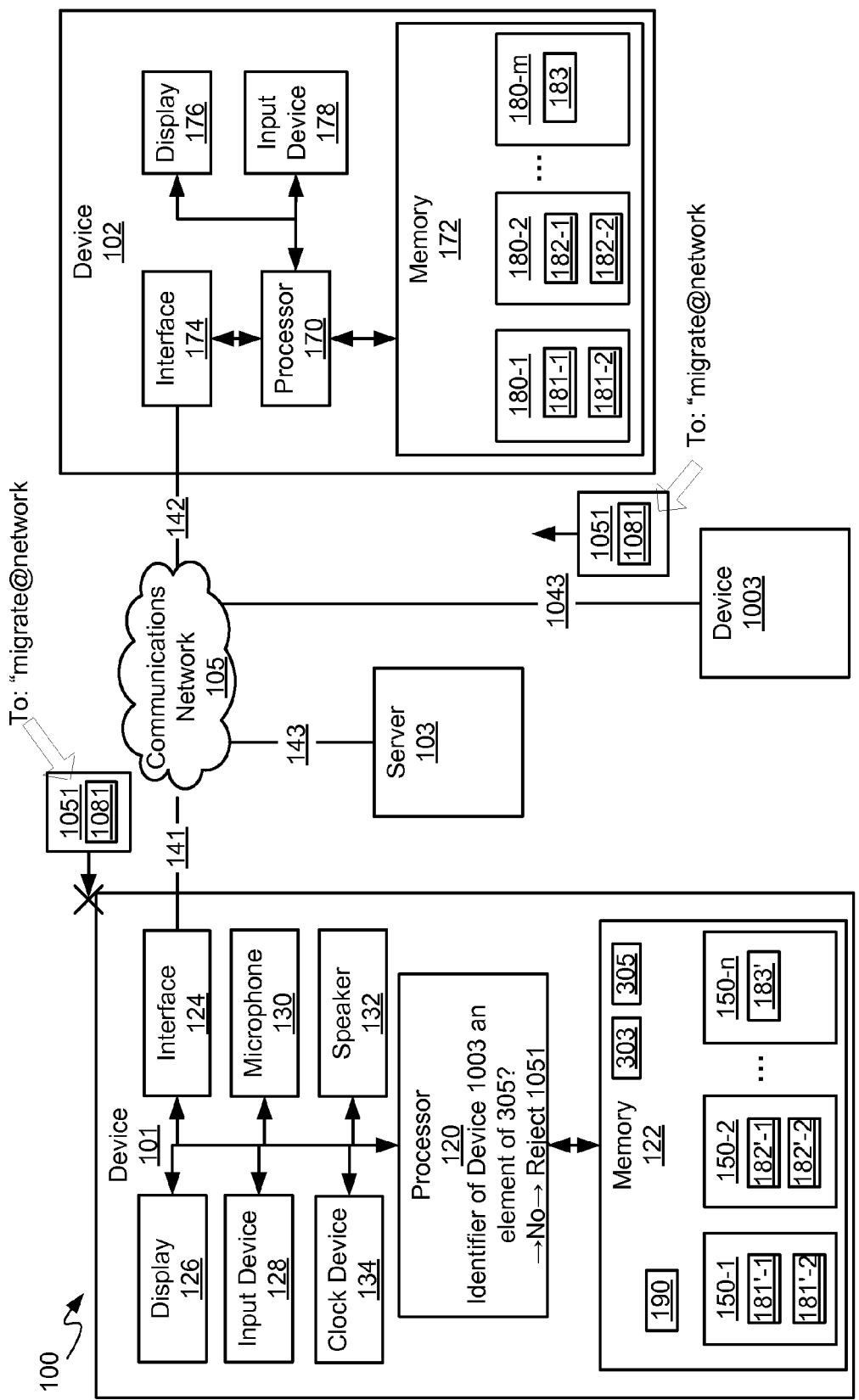
FIG. 10 depicts the system of FIG. 1 with a third device that is not approved for transmitting data to the first device via the network address dedicated to data migration, according to non-limiting implementations.

Attention is next directed to FIG. 10 which depicts system 100 after a new device 1003 has connected to network 105 via a link 1043, similar to one or more of links 141, 142, 143, and has maliciously obtained the network address associated with device 101 dedicated to data migration. Device 1003 hence attempts to transmit a message 1051 to the network address associated with device 101 dedicated to data migration, message 1051 having an attachment 1081 that can comprise one or more of a malicious attachment, malicious code, spam, and the like.

However, processor 120 processes message 1051 to determine whether an identifier associated with message 1051 (e.g. an identifier of device 1003) is an element of identifier 305. If not message 1051 is one or more of rejected and discarded. In other words processor 120 is further configured to: when message 1051 is received from any address other than a set of given addresses respectively associated with a set of given devices (e.g. device 102), discard message 1051 without storing attachment 1081. This prevents malicious attachments from non-approved devices from being stored in portions 150.

Figure 11:
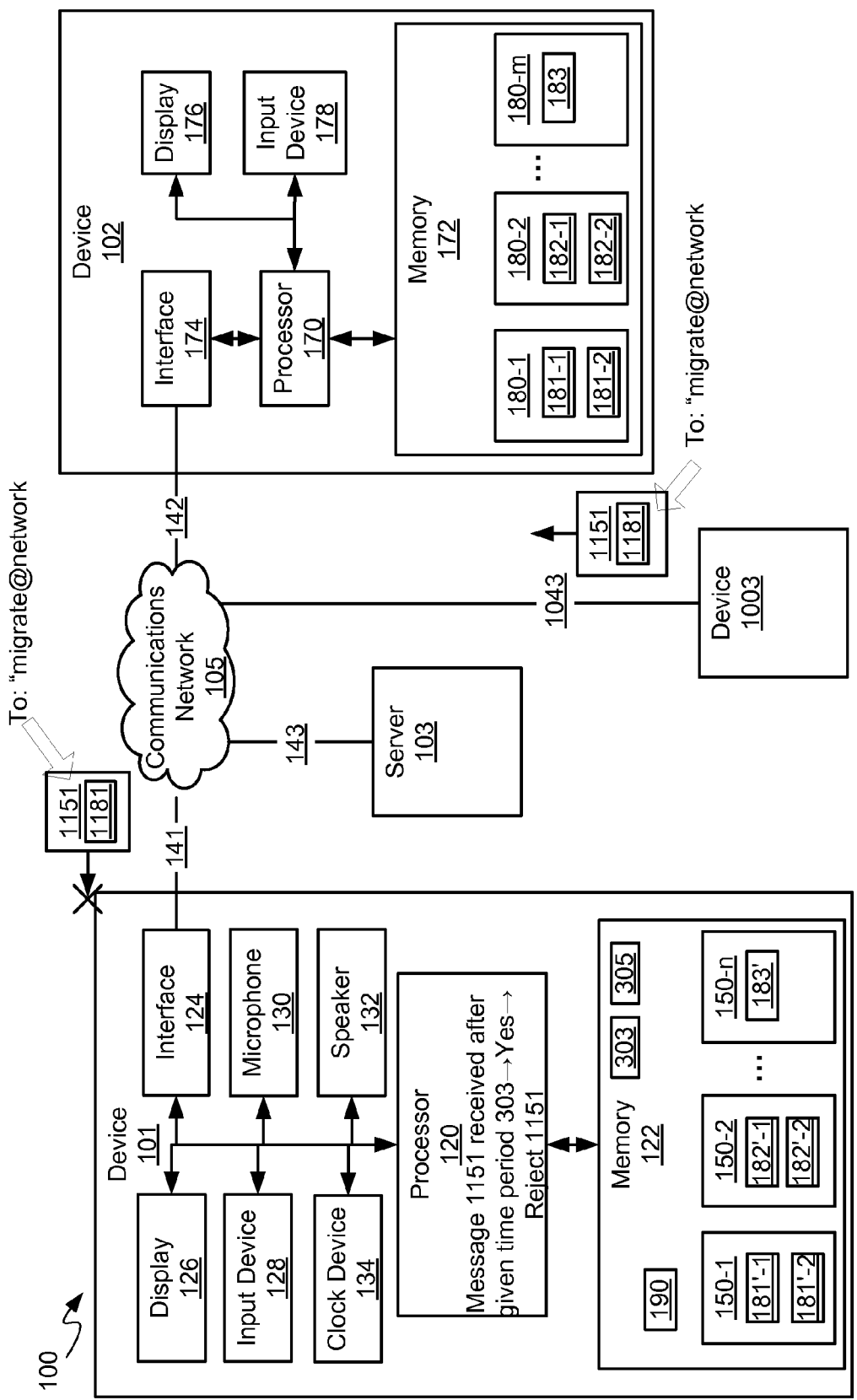
FIG. 11 depicts the system of FIG. 1 with a message transmitted to the first device via the network address dedicated to data migration outside of a given time period, according to non-limiting implementations.

Alternatively, attention is next directed to FIG. 11 which depicts system 100 after device 1003 has connected to network 105 and after given time period 303 has expired. Device 1003 hence attempts to transmit a message 1151 to the network address associated with device 101 dedicated to data migration, message 1151 having an attachment 1181 that can comprise one or more of a malicious attachment, malicious code, spam, and the like.

However, processor 120 processes a time that message 1151 was received to determine whether message 1151 was received after given time period 303 has expired. If so message 1151 is one or more of rejected and discarded. In other words processor 120 is further configured to: when message 1151 is received after given time period 303, discard message 1151 without storing attachment 1181. This prevents data from being stored after given time period 303 has expired.

It is yet further appreciated that a combination of given time period 303 and identifier 305 can be used to prevent messages from device 1003 from being processed by device 101.

Figure 12:
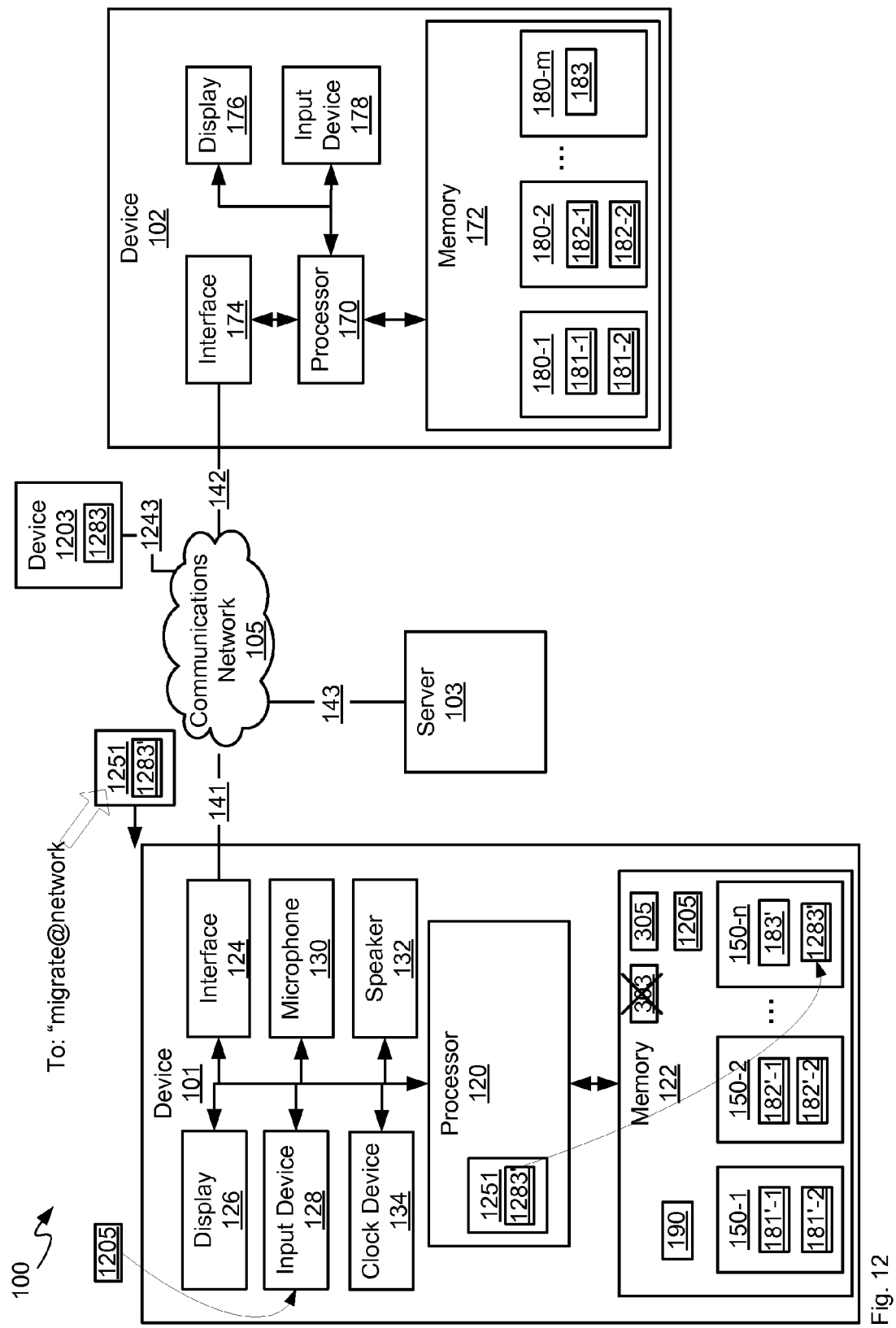
FIG. 12 depicts the system of FIG. 1 with a fourth device that is approved for transmitting data to the first device via the network address dedicated to data migration, according to non-limiting implementations.

Attention is next directed to FIG. 12 which depicts system 100 after a new device 1203 has connected to network 105 via a link 1243, similar to one or more of links 141, 142, 143. However, in contrast to device 1003, device 1203 can be associated with device 101. For example, device 101 can comprise a mobile device of a user and device 1203 can comprise another communication device (and/or computing device and the like) of the user of device 101. In other words, a common user of devices 101, 1203 wishes to migrate data from device 1203 to device 101.

It is further appreciated that such data migration can occur outside of given time period 303 and hence either given time period 303 is deleted (as depicted) from device 101, e.g. via a user interaction with device 101 or given time period 303 is changed to a time period that includes a time during which data migration is to occur from device 1203 to device 101, which can also occur via a user interaction with device 101. For example, an application (not depicted) at device 101 can be used to one or more of delete (as depicted) given time period 303 and change given time period 303. Alternatively, given time period 303 can be optional and device 101 is never provisioned with given time period 303.

In any event, an identifier 1205 of one or more of a device 1203 and an account associated with device 1203 is provisioned at device 101, for example via receipt of identifier 1205 via input device 128, for example via an application (not depicted) at device 101 for adding identifiers of devices and/or accounts that can use the network address of device 101 dedicated to data migration to device 101. In other words, identifiers 305, 1205 together comprise a white list of devices and/or accounts that can use the network address of device 101 dedicated to data migration to device 101. Identifier of other devices that can use the network address of device 101 dedicated to data migration to device 101 can be stored at memory 122 in a similar manner.

In any event, once identifier 1205 is provisioned at device 101, device 1203 can transmit a message 1251 with an attachment 1283', attachment 1283' comprising a copy of a file 1283 stored at device 1203, which can be similar to one or more of files 181, 182, 183. When message 1251 is received at device 101, processor 120 determines that message 1251 is received from a device 1203 and/or account identified by identifier 1205 and processes message 1251 to: determine an attachment type of attachment 1283' received with message 1251 via interface 124, message 1251 associated with a network address of device 101 dedicated to data migration; and, store attachment 1283' in a portion 150-*n* of memory 122 associated with the attachment type. For example, in these implementations, attachment 1283' is a similar attachment type as attachment 183' and is stored in portion 150-*n* with attachment 183'.

Again, no mailbox notification of message 1251 is provided and message 1251 can be discarded when attachment 1283' is stored; hence; neither is message 1251 provided at a mailbox of device 101.

In some implementations, one or more of device 102 and device 1203 can comprise an application for automatically generating respective messages 501, 901, 1251 addressed to the network address dedicated to data migration, and attach respective attachments 181', 182', 183' 1283' thereto. For example, such an application can configured to process a respective memory of each of devices 102, 1203, attach copies of respective files 181, 182, 183, 1283 to respective messages and transmit the messages to device 101 via the network address dedicated to data migration, which can be provisioned at each device 102, 1203 via interactions with server 103 and/or via receipt of the network address via respective input devices.

However, in some implementations, such an application, or any other data migration application, can only be installed at one or more of device 102, 1203 in a walled garden and/or controlled data ecosystem model, and an entity wishing to, for example, prevent a migration from device 102 can prevent such an application from being installed at device 102.

Hence, a special network address can be assigned to a device, the network address dedicated to data migration, in order to conveniently transfer data to a first device from at least a second device. Messages received at the first device via the special network address are handled differently from messages received via a public network address. Specifically attachments to such messages are categorized and/or filtered by attachment type and filed in an appropriate portion and/or folder and/or database category of a memory of the first device. Hence, data is not only migrated to the first device but automatically stored in an appropriate portion of the memory. Such data migration can be especially useful in walled garden environments where a user is attempting to migrate between devices in different walled gardens and/or different data ecosystems, and entities associated with the data ecosystems have but roadblocks in place to prevent such migration. For example, the second device from which migration is to occur could be provisioned with an application for transferring data to the new/first device, however the entity associated with the respective data ecosystem of the second device can generally prevent such applications from being installed at the second device to, in turn, prevent the user from leaving the data ecosystem. Present implementations get around these restrictions by enabling data to be transmitted via attachments to messages transmitted to the special data migration network address.

Those skilled in the art will appreciate that in some implementations, the functionality of devices 101, 102 and server 103 can be implemented using pre-programmed hardware or firmware elements (e.g., application specific integrated circuits (ASICs), electrically erasable programmable read-only memories (EEPROMs), etc.), or other related components. In other implementations, the functionality of devices 101, 102 and server 103 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A device comprising:
   a processor, a communication interface and a memory, the processor configured to:
   determine an attachment type of an attachment received with a message via the communication interface, the message addressed with a dedicated migration network address of the device dedicated to data migration, the dedicated migration network address dedicated to data migration distinct from a public network address associated with the device, such that the device is associated with two addresses, the message being received from one or more of a given device and a given account, and the attachment comprises data for migrating from one or more of the given device and the given account to the device;
   when the message is received within a given time period, store the attachment in a portion of the memory associated with the attachment type; and,
   when the message is received after the given time period, discard the message without storing the attachment, such that messages received at the device via the dedicated migration network address are handled differently from messages received via the public network address.

2. The device of claim 1, wherein the processor is further configured to: when the message is received from any address other than a set of given addresses respectively associated with a set of given devices, discard the message without storing the attachment.

3. The device of claim 1, wherein the processor is further configured to discard the message once the attachment is stored in the portion of the memory associated with the attachment type.

4. The device of claim 1, wherein the processor is further configured to prevent the message from being provided in a mailbox of a messaging application.

5. The device of claim 1, wherein the processor is further configured to prevent mailbox notifications of the message from being provided at the device.

6. The device of claim 1, further comprising a display, and the processor is further configured to provide an indication at the display of receiving the attachment.

7. The device of claim 1, further comprising a display, and the processor is further configured to:
   prior to receiving the message, receive a communication, via the communication interface, that the dedicated migration network address dedicated to data migration has been associated with the device for the given time period; and,
   provide an indication at the display of the given time period.

8. The device of claim 1, wherein the portion of the memory associated with the attachment type comprises one or more of a folder and a database category associated with one or more of the attachment type and an application associated with the attachment type.

9. A method comprising:
at a device comprising a processor, a communication interface and a memory, determining, at the processor, an attachment type of an attachment received with a message via the communication interface, the message addressed with a dedicated migration network address of the device dedicated to data migration, the dedicated migration network address dedicated to data migration distinct from a public network address associated with the device, such that the device is associated with two addresses, the message being received from one or more of a given device and a given account, and the attachment comprises data for migrating from one or more of the given device and the given account to the device;
when the message is received within a given time period, storing the attachment in a portion of the memory associated with the attachment type; and,
when the message is received after the given time period, discarding the message without storing the attachment, such that messages received at the device via the dedicated migration network address are handled differently from messages received via the public network address.

10. The method of claim 9, further comprising: when the message is received from any address other than a set of given addresses respectively associated with a set of given devices, discarding the message without storing the attachment.

11. The method of claim 9, further comprising discarding the message once the attachment is stored in the portion of the memory associated with the attachment type.

12. The method of claim 9, further comprising preventing the message from being provided in a mailbox of a messaging application.

13. The method of claim 9, further comprising preventing mailbox notifications of the message from being provided at the device.

14. The method of claim 9, wherein the device further comprises a display, and the method further comprises providing an indication at the display of receiving the attachment.

15. The method of claim 9, wherein the device further comprises a display, and the method further comprises:
prior to receiving the message, receiving a communication, via the communication interface, that the dedicated migration network address dedicated to data migration has been associated with the device for the given time period; and,
providing an indication at the display of the given time period.

16. The method of claim 9, wherein the portion of the memory associated with the attachment type comprises one or more of a folder and a database category associated with one or more of the attachment type and an application associated with the attachment type.

17. A computer program product, comprising a non-transitory computer usable medium having a computer readable program code adapted to be executed to implement a method comprising:
at a device comprising a processor, a communication interface and a memory, determining, at the processor, an attachment type of an attachment received with a message via the communication interface, the message addressed with a dedicated migration network address of the device dedicated to data migration, the dedicated migration network address dedicated to data migration distinct from a public network address associated with the device, such that the device is associated with two addresses, the message being received from one or more of a given device and a given account, and the attachment comprises data for migrating from one or more of the given device and the given account to the device;
when the message is received within a given time period, storing the attachment in a portion of the memory associated with the attachment type; and,
when the message is received after the given time period, discarding the message without storing the attachment, such that messages received at the device via the dedicated migration network address are handled differently from messages received via the public network address.

* * * * *